United States Patent
Jiao

(10) Patent No.: US 11,728,066 B2
(45) Date of Patent: Aug. 15, 2023

(54) LITHIUM-TELLURIUM SILICON-LEAD BISMUTH MULTI-COMPONENT GLASS-OXIDE-COMPLEX SYSTEM AND CONDUCTIVE PASTE CONTAINING SAME

(71) Applicant: Jiangsu Riyu Photovoltaic New Material Technology Co. Ltd, Wuxi (CN)

(72) Inventor: Yongli Jiao, Wuxi (CN)

(73) Assignee: JIANGSU RIYU PHOTOVOLTAIC NEW MATERIAL TECHNOLOGY CO. LTD, Wuxi (CN)

(*) Notice: Subject to any disclaimer, the term of this patent is extended or adjusted under 35 U.S.C. 154(b) by 0 days.

(21) Appl. No.: 17/973,725

(22) Filed: Oct. 26, 2022

(65) Prior Publication Data
US 2023/0075790 A1  Mar. 9, 2023

(30) Foreign Application Priority Data
Sep. 29, 2022  (CN) .......................... 202211194589.4

(51) Int. Cl.
  *H01B 1/16* (2006.01)
  *C03C 3/07* (2006.01)
(52) U.S. Cl.
  CPC ................. *H01B 1/16* (2013.01); *C03C 3/07* (2013.01)
(58) Field of Classification Search
  CPC .... H01B 1/00; H01B 1/16; C09D 5/24; C03C 3/07; C03C 14/006
  See application file for complete search history.

(56) References Cited

U.S. PATENT DOCUMENTS

| 10,040,717 B1* | 8/2018 | Mikeska | ................. C03C 3/062 |
| 2009/0189126 A1* | 7/2009 | Prunchak | ............... C09D 11/52 501/24 |

(Continued)

FOREIGN PATENT DOCUMENTS

| CN | 107721183 A | 2/2018 |
| CN | 111599506 A | 8/2020 |

(Continued)

OTHER PUBLICATIONS

Ebong et al "Understanding the influence of tellurium oxide in front Ag paste for contacting silicon solar cells with homogeneous high sheet resistance emitter", Japanese Journal of Applied Physics 56, 08MB07 (2017).*

*Primary Examiner* — Mark Kopec
(74) *Attorney, Agent, or Firm* — IPro, PLLC; Na Xu

(57) ABSTRACT

The present disclosure discloses a lithium-tellurium silicon-lead bismuth multi-component glass-oxide-complex system and conductive paste containing same, belonging to the technical field of solar cells. According to the present disclosure, a "functional modularization" strategy is adopted in a formula design of the glass-oxide-complex system, and glass oxide systems with selective reactivity for different passivation layers are compounded based on the structures, compositions and thicknesses of the passivation layers, so that a paste formula is developed, which is composed of lithium-containing, tellurium-silicon-containing and lead-containing glass oxides. Due to adoption of the modularized formula strategy, active ingredients can be better controlled, and the overall paste formula is more optimized, so that the laminated passivation layers can be selectively burned through to obtain a more balanced contact, and better battery performance on silicon wafers with different passivation (Continued)

layer thicknesses can be achieved, thus achieving excellent photoelectric conversion efficiency.

2 Claims, 1 Drawing Sheet

(56) References Cited

U.S. PATENT DOCUMENTS

| | | | | |
|---|---|---|---|---|
| 2019/0334040 A1* | 10/2019 | Kim | .......................... | H01B 1/02 |
| 2020/0262741 A1* | 8/2020 | Jang | .......................... | C03C 4/14 |

FOREIGN PATENT DOCUMENTS

| | | | |
|---|---|---|---|
| CN | 114180844 A | 3/2022 | |
| CN | 114315159 A | 4/2022 | |

\* cited by examiner

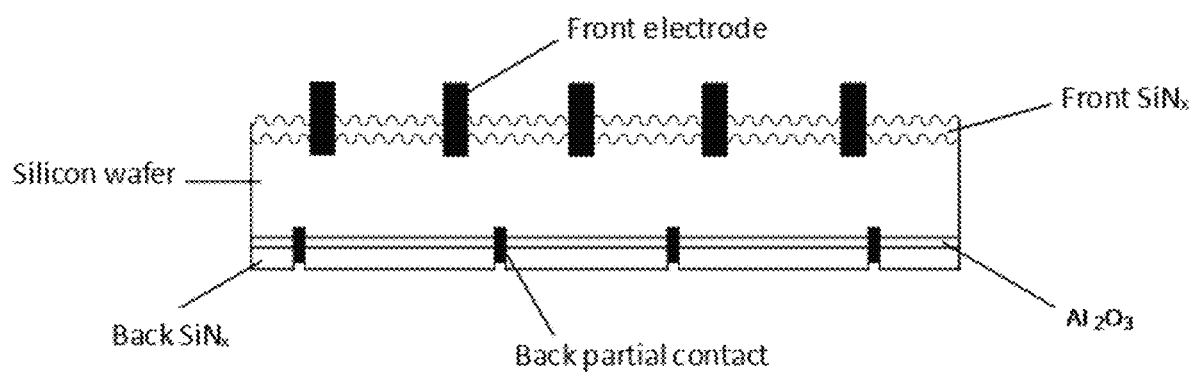

LITHIUM-TELLURIUM SILICON-LEAD
BISMUTH MULTI-COMPONENT
GLASS-OXIDE-COMPLEX SYSTEM AND
CONDUCTIVE PASTE CONTAINING SAME

TECHNICAL FIELD

The present disclosure belongs to the technical field of solar cells, and particularly relates to a lithium-tellurium silicon-lead bismuth multi-component glass-oxide-complex system and conductive paste containing same.

BACKGROUND

Solar cells are devices that use a photoelectric effect to convert light energy into electrical energy. Solar energy is a green energy source of great concern because it is sustainable and only produces pollution-free by-products. Therefore, a great deal of research in industry and academia is now devoted to the development of solar cells with enhanced efficiency and the continuous reduction of material and manufacturing costs.

When light hits the solar cell, part of the incident light is reflected by a surface of the solar cell, and the rest of the light is transmitted into the solar cell. The transmitted light/photons are absorbed by the solar cell, which is usually made of semiconductor materials such as silicon. The absorbed photon energy excites electrons from the atoms of the semiconductor materials, creating electron-hole pairs. These electron-hole pairs are then separated by p-n junctions and collected by metallized electrodes applied on the surfaces of the solar cells.

The performance of devices (such as a solar cell) based on semiconductor crystalline silicon depends largely on the minority carrier recombination in a semiconductor and the surface area of the cell itself. Therefore, reducing surface recombination is crucial for these devices. With the decrease of the sizes of silicon semiconductor devices such as a solar cell wafer thickness, a surface recombination effect becomes more and more important. In recent years, the use of amorphous films based on silicon hydride compounds to passivate the surface of silicon has been the focus of research, especially for solar cell applications. It has been reported that the effective surface recombination velocity (seff) at a silicon interface is significantly reduced when amorphous silicon, amorphous silicon oxide, amorphous silicon nitride and amorphous silicon carbide are used for passivation. The films studied include amorphous hydrogenated silicon nitride ($Si_xN_y$ $H_z$), hereinafter referred to as $SiN_x$ films. These films are usually deposited at low temperatures (400° C.) by using silane gas and other reaction gases (such as ammonia or nitrogen) through plasma enhanced chemical vapor deposition (PECVD). Current methods have shown that surface passivation is maximized when a silicon-rich $SiN_x$ film with a refractive index greater than 2.3 is used, but this film also loses light capture efficiency due to absorption in the passivation layer.

Typical metallized paste contains metal particles, glass powder, and an organic medium. During firing, glass particles in a composition are etched through an anti-reflective coating, helping to form contact between metal and n+ type silicon. On the other hand, the glass must not be too active so as to prevent the p-n junctions from being damaged after firing. Therefore, the paste design goal is to reduce a contact resistance (low Rhoc) while keeping the p-n junctions intact (low Jmet, high Voc), thereby increasing the cell conversion efficiency.

The existing reports on the contact process of conductive paste on silicon wafers show that: on a silver electrode-interface glass layer-silicon surface, the migration of alkali metal ions and other metal ions in the contact areas will form a recombination center in a high-temperature sintering process, which will affect the minority carrier lifetime of p-n junctions of a solar cell, and thus affect the open-circuit voltage of the cell; and moreover, these highly active ions will also affect passivation layers of the contact areas, and even migrate to areas adjacent to the metallization. In a PERC-SE process, which has become popular in recent years, the use of lasers makes a metallization area more sensitive to the influence of the metallized paste. Therefore, controlling the reactivity of the metallized paste, balancing excellent metallization contact and reducing the negative impact of active metal ion migration are challenges for the formula design of glass and oxide complex systems in the metallized paste.

SUMMARY

In order to solve the above problems, a "functional modularization" strategy is adopted in a formula design of a glass-oxide-complex (GOC) system, which separates alkali metal ions with high mobility and reactivity from glass bodies with high fluidity, thus constructing a multi-component glass-oxide-complex system, which includes a lithium-containing A-GOC, a tellurium silicon-containing T-GOC, a lead bismuth-containing L-GOC, and a balanced phase glass-oxide-complex. Due to adoption of the modularized formula strategy, active ingredients can be better controlled, so as to achieve a balance between silicon wafer corrosion and ohmic contact, thereby improving battery performance and conversion efficiency.

A first objective of the present disclosure is to provide a lithium-tellurium silicon-lead bismuth multi-component glass-oxide-complex system for solar cell conductive paste, which is prepared by mixing a lithium-containing glass-oxide-complex (A-GOC), a tellurium silicon-containing glass-oxide-complex (T-GOC), a lead bismuth-containing glass-oxide-complex (L-GOC), and a balanced phase glass-oxide-complex (D-GOC);

the lithium-containing glass-oxide-complex (A-GOC) is obtained by mixing and melting $Li_2O$, $Bi_2O_3$, PbO and a metal oxide M1 to form a glass-oxide frit, then quenching, and grinding;

the lead bismuth-containing glass-oxide-complex (L-GOC) is obtained by mixing and melting PbO, $Bi_2O_3$, $SiO_2$, $Al_2O_3$, and a metal oxide M2 to form a glass-oxide frit, then quenching, and grinding;

the tellurium silicon-containing glass-oxide-complex (T-GOC) is obtained by mixing and melting $SiO_2$, $TeO_2$ and a metal oxide M3 to form a glass-oxide frit, then quenching, and grinding;

the balanced phase glass-oxide-complex (D-GOC) is obtained by mixing and melting one or more metal oxides used in the A-GOC, the L-GOC and the T-GOC described above to form a glass-oxide frit, then quenching, and grinding;

the metal oxide M1 is an oxide of at least one of Na, K, Mg, Ca, Sr, Ba, Zn, P, B, Ti, Sb, and Ge;

the metal oxide M2 is an oxide of at least one of Zn, P, B, Ag, Al, Ti, W, V, Cr, Mn, Co, Ni, Cu, Nb, Ta, Th, Ge, Mo, La, Sb, Bi, and Ce; and the metal oxide M3 is an oxide of at least one of Na, Zn, P, B, Ag, Al, Ti, W, V, Cr, Mn, Co, Ni, Cu, Nb, Ta, Th, Ge, Mo, La, Sb, Bi, and Ce.

In one embodiment of the present disclosure, the lithium-tellurium silicon-lead bismuth multi-component glass-oxide-complex system is composed of the multiple GOCs separated from each other: the A-GOC, the L-GOC, the T-GOC and the D-GOC, where the A-GOC accounts for 0.1-50% by mass in the lithium-tellurium silicon-lead bismuth multi-component glass-oxide-complex system; the L-GOC accounts for 5-30% by mass in the lithium-tellurium silicon-lead bismuth multi-component glass-oxide-complex system; the T-GOC accounts for 20-90% by mass in the lithium-tellurium silicon-lead bismuth multi-component glass-oxide-complex system; and the D-GOC accounts for 0-20% by mass in the lithium-tellurium silicon-lead bismuth multi-component glass-oxide-complex system.

In one embodiment of the present disclosure, in the lithium-tellurium silicon-lead bismuth multi-component glass-oxide-complex system, the ratio of the total mass of the L-GOC, the T-GOC and the D-GOC to the mass of the A-GOC is (1-10):1, preferably (1-4):1, and further preferably 2:1.

In one embodiment of the present disclosure, a formula of the A-GOC is as follows:

$$[Li_2O]_{a1}\text{—}[SiO_2\text{—}Bi_2O_3]_{b1}\text{-}[M1O_{n1}]_{c1},$$

where a1, b1 and c1 are respectively the mass fractions of corresponding oxides in the A-GOC in the A-GOC; a1+b1+c1=100%, 2%<a1<50%, 43%<b1<85%, 1%<c1<10%; and the value of n1 is used for balancing positive and negative charges of the whole formula.

In one embodiment of the present disclosure, a formula of the L-GOC is as follows:

$$[PbO]_{a2}\text{—}[Bi_2O_3]_{b2}\text{-}[M2O_{n2}]_{c2},$$

where a2, b2 and c2 are respectively the mass fractions of corresponding oxides in the L-GOC in the L-GOC; a2+b2+c2=100%, 2%<a2<50%, 43%<b2<85%, 1%<c2<10%; and the value of n2 is used for balancing positive and negative charges of the whole formula.

In one embodiment of the present disclosure, a formula of glass or crystalline oxides containing tellurium and silicon in the T-GOC is as follows:

$$[TeO_2]_{a3}\text{—}[SiO_2]_{b3}\text{-}[M3O_{n3}]_{c3},$$

where a3, b3 and c3 are respectively the mass fractions of corresponding oxides in the T-GOC in the T-GOC; a3+b3+c3=100%, 10%<a3<80%, 10%<b3<80%, 1%<c3<10%; and the value of n3 is used for balancing positive and negative charges of the whole formula.

In one embodiment of the present disclosure, the A-GOC does not contain tellurium or silicon; and the T-GOC does not contain lithium.

In one embodiment of the present disclosure, based on the total mass of the A-GOC, the formula of the A-GOC includes: 15-25% by mass of $Li_2O$, 50-70% by mass of PbO, 10-20% by mass of $Bi_2O_3$, 0-6% by mass of ZnO, and 0.5-3% by mass of $B_2O_3$.

In one embodiment of the present disclosure, based on the total mass of the L-GOC, the formula of the L-GOC includes: 2-50% by mass of PbO, 5-85% by mass of $Bi_2O_3$, 2-10% by mass of $SiO_2$, 0.5-15% by mass of $Al_2O_3$, 0-6% by mass of ZnO, and 0.5-25% by mass of $B_2O_3$.

In one embodiment of the present disclosure, based on the total mass of the T-GOC, the formula of the T-GOC includes: 10-20% by mass of $SiO_2$, 60-80% by mass of $TeO_2$, 2-20% by mass of $Bi_2O_3$, 0.5-2% by mass of $B_2O_3$, and 0.5-2% by mass of $Na_2O$.

In one embodiment of the present disclosure, based on the total mass of the D-GOC, the formula of the D-GOC includes: 35-50% by mass of $SiO_2$, 20-30% by mass of PbO, 2-10% by mass of MgO, 0.5-2% by mass of $TiO_2$, and 25-40% by mass of $Bi_2O_3$.

In one embodiment of the present disclosure, a preparation process of the lithium-tellurium silicon-lead bismuth multi-component glass-oxide-complex system for the solar cell conductive paste is as follows:

step 1: production of the lithium-tellurium silicon-lead bismuth multi-component glass-oxide-complex (GOC) system: preparing the A-GOC, the L-GOC, the T-GOC, and the D-GOC, respectively; and step 2: mixing the multiple GOCs, i.e., the A-GOC, the L-GOC, the T-GOC and the D-GOC.

In one embodiment of the present disclosure, a production method the GOCs includes commonly used glass body melting and quenching, or other inorganic solid-phase synthesis or non-high-temperature wet chemical methods:

in the typical melting and quenching method, a proper amount of raw materials (usually in a form of powder) are mixed first, then the obtained mixture is melted into molten glass at 500-1,300° C., and the molten glass forms a uniform frit; the frit is quenched (in water or by means of a cooling roller), and is then ground and sieved by ball milling or air flow milling; the coarse powder is subjected to secondary grinding, for example in a ball mill or an air-flow mill until fine powder is produced; the glass powder can be ground to an average particle size (d50) of about 0.01-10 μm, preferably about 0.1-5 μm;

alternatively, in the inorganic solid-phase synthesis, the well-mixed oxide raw materials are usually placed in a crucible or a quartz tube, and are enabled to undergo a solid-phase synthesis reaction at an appropriate high temperature under the condition of vacuum, nitrogen protection or air for 5-24 hours so as to produce complex oxide powder in an expected crystalline state; the complex oxide powder can be ground to the average particle size (d50) of about 0.01-10 μm, preferably about 0.1-5 μm; and alternatively, the glass powder and the complex oxides GOCs can also be prepared by using the wet chemical methods, including, but not limited to, sol-gel methods, precipitation, hydrothermal/solvothermal methods and pyrolysis methods, so as to obtain powder with a desired particle size.

In one embodiment of the present disclosure, the premixing of the multiple GOCs is as follows:

In order to ensure that the lithium-tellurium silicon-lead bismuth multi-component glass-oxide-complex (GOC) system can be evenly distributed in paste and react with the surface of a silicon wafer uniformly, sufficient premixing is necessary. In an implementation process of the present disclosure, an appropriate proportion of the lithium-containing A-GOC (high activity), the lead bismuth-containing L-GOC (high corrosivity), the tellurium silicon-containing T-GOC (high fluidity) and the D-GOC used as a balanced phase can be selected according to the requirements of customers for the silicon wafer, placed in the ball mill, and subjected to sufficient premixing, which not only achieves a mutually homogeneous distribution, but also makes the particle size synchronously reduce to the expected particle size distribution.

A second objective of the present disclosure is to provide solar cell conductive paste containing a lithium-tellurium silicon-lead bismuth multi-component glass-oxide-complex system, and the conductive paste is prepared from a conductive metal component, the above-mentioned lithium-tellurium silicon-lead bismuth multi-component glass-oxide-complex system, and an organic carrier.

In one embodiment of the present disclosure, the conductive metal component includes silver, gold, platinum, palladium, copper, nickel, and a combination thereof.

In one embodiment of the present disclosure, the weight of the conductive metal component accounts for 85-99% of the entire conductive paste.

In one embodiment of the present disclosure, the weight of the lithium-tellurium silicon-lead bismuth multi-component glass-oxide-complex system accounts for 0.2-5% of the entire conductive paste, and further optionally 2-5%.

In one embodiment of the present disclosure, the organic carrier accounts for 2-10% of the entire conductive paste.

In one embodiment of the present disclosure, the organic carrier contains an organic solvent and one or any combination of a binder, a surfactant and a thixotropic agent.

In one embodiment of the present disclosure, the organic solvent is selected from carbitol, terpineol, hexyl carbitol, 2,2,4-trimethyl-1,3-pentanediol monoisobutyrate, butyl carbitol, butyl carbitol acetate, dimethyl adipate glycol ether, and any combination thereof.

In one embodiment of the present disclosure, the binder is selected from ethyl cellulose, phenolic resin, polyacrylic acid, polyvinyl butyral, polyester resin, polycarbonate, polyethylene resin, polyurethane resin, rosin derivatives, and any combination thereof.

In one embodiment of the present disclosure, the surfactant is selected from polyethylene oxide, polyethylene glycol, benzotriazole, poly(ethylene glycol) acetic acid, lauric acid, oleic acid, capric acid, myristic acid, linoleic acid, stearic acid, palmitic acid, stearate, palmitate, and any combination thereof.

In one embodiment of the present disclosure, the preparation of the solar cell conductive paste includes the following steps:

step 1: preparing the organic carrier;

step 2: selecting the lithium-tellurium silicon-lead bismuth multi-component glass-oxide-complex (GOC) system pre-mixed according to a specific ratio; and step 3: grinding the raw materials according to the above proportions by using a stirrer and a three-roll grinder into the solar cell conductive paste which is fine and uniform in appearance and has no large particles.

The present disclosure further provides a solar cell, a surface of which contains the solar cell metallized paste.

In one embodiment of the present disclosure, the solar cell metallized silver paste and aluminum paste are respectively printed on the front and back sides of a silicon wafer in predetermined patterns by means of silk-screen printing, and dried; then, the printed silicon wafer is sintered in an environment of 400-900° C.; and after the sintering is completed, the product is cooled to room temperature to prepare the solar cell.

In one embodiment of the present disclosure, the sintering time is 30-50 s.

In one embodiment of the present disclosure, the multi-component glass-oxide complex formula of the present disclosure enables the overall formula of the paste to be adjusted according to the diffusion square resistances, printing patterns, and sintering conditions of the corresponding silicon wafers. According to an action mechanism of solar cell paste, a reaction process of glass powder and $SiN_x$ is as follows:

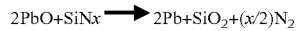
$2PbO + SiNx \rightarrow 2Pb + SiO_2 + (x/2)N_2$

$Bi_2O_3 + 3\ SiNx \rightarrow 4Bi + 3SiO_2 + N_2$

The generated Bi and SiO2 are mixed with a glass powder complex system again to form a new glass phase, which continues to react with a passivation film.

Beneficial Effects

A "functional modularization" strategy is adopted in a formula design of a glass-oxide-complex system of the present disclosure. The present disclosure separates alkali metal ions with high mobility and reactivity from glass bodies with high fluidity, thus constructing a multi-component complex system, which includes a lithium-containing A-GOC (high activity), a lead bismuth-containing L-GOC (high corrosivity), a tellurium silicon-containing T-GOC (high fluidity), and the D-GOC used as a balanced phase.

At present, most of paste formulas are adjusted and optimized by means of a glass formula itself to achieve a balance between metallization contact and metal ion migration. However, since the glass formula needs to be adjusted as a whole, or a combination of several glass formulas needs to be used, the reactivity and thermal property of the conductive paste as well as the flexibility for formula improvement are very low. According to the present disclosure, due to the mutual separation of the lithium-containing A-GOC, the lead bismuth-containing L-GOC, the tellurium silicon-containing T-GOC and the D-GOC, in the formula design of the conductive paste, the ratio of each component may be freely adjusted according to actual application needs. It is not necessary to find a balance point of reactivity and fluidity in the same glass formula, thus avoiding a large number of repeatability and gradient adjustment experiments, and shortening a formula adjustment period; and therefore, the design greatly improves the efficiency of formula adjustment. Furthermore, the overall paste formula optimized by the present disclosure can overcome the foggy black phenomenon of cells on different silicon wafers to a great extent, thus realizing better battery performance and achieving best photoelectric conversion efficiency.

BRIEF DESCRIPTION OF FIGURES

The Drawing is a schematic diagram of a structure of a solar cell.

DETAILED DESCRIPTION

Example 1

Preparation of a Glass-Oxide-Complex (GOC) System:

Different A-GOC1, L-GOC1, T-GOC1, and D-GOC1 were prepared from the components described in Table 1 below, and a single component Mix1 without separation was also prepared as a control. Samples were prepared in batches of 200 g by mixing the individual oxide components in the amounts specified in Table 1. The oxide mixture was put into a 0.5 L platinum crucible, and then the crucible was put into a glass melting furnace at 1,300° C. for 30 minutes to obtain a glass and oxide frit. The frit was taken out and poured into a twin-roll cooler for quenching to obtain glass slag. After being ground in a 1 L planetary ball mill, the glass slag was sieved with a 325-mesh sieve to obtain A-GOC1 powder, L-GOC1 powder, T-GOC1 powder, D-GOC1 powder, and Mix1 powder, respectively.

TABLE 1

Formulas of A-GOC1, L-GOC1, T-GOC1, D-GOC1 and Mix1

|  |  | Mix1 | A-GOC1 | L-GOC1 | T-GOC1 | D-GOC1 |
|---|---|---|---|---|---|---|
| A-GOC | $Li_2O$ | 6.04% | 19.36% | / | / | / |
|  | PbO | 18.20% | 58.31% | / | / | / |
|  | $Bi_2O_3$ | 4.87% | 15.60% | / | / | / |
|  | ZnO | 1.80% | 5.77% | / | / | / |
|  | $B_2O_3$ | 0.30% | 0.96% | / | / | / |
| L-GOC | PbO | 0.57% | / | 2.19% | / | / |
|  | $Bi_2O_3$ | 16.39% | / | 63.02% | / | / |
|  | $Al_2O_3$ | 2.83% | / | 10.88% | / | / |
|  | $SiO_2$ | 0.57% | / | 2.19% | / | / |
|  | $B_2O_3$ | 5.65% | / | 21.72% | / | / |
| T-GOC | $SiO_2$ | 6.07% | / | / | 14.95% | / |
|  | $TeO_2$ | 27.27% | / | / | 67.14% | / |
|  | $Bi_2O_3$ | 6.07% | / | / | 14.95% | / |
|  | $B_2O_3$ | 0.60% | / | / | 1.48% | / |
|  | $Na_2O$ | 0.60% | / | / | 1.48% | / |
| D-GOC | $SiO_2$ | 1.00% | / | / | / | 46.08% |
|  | PbO | 0.50% | / | / | / | 23.04% |
|  | MgO | 0.05% | / | / | / | 2.31% |
|  | $TiO_2$ | 0.02% | / | / | / | 0.92% |
|  | $Bi_2O_3$ | 0.60% | / | / | / | 27.65% |

Preparation of Conductive Paste:

A list of components used in the following examples and control examples is as follows:

(1) conductive powder: spherical silver powder (AG-4-8, Dowa HighTech Co., Ltd.) with an average particle size (D50) of 2 μm;

(2) a glass and oxide complex GOC: Mix1, or a multi-component mixture of A-GOC1, L-GOC1, T-GOC1, and D-GOC1;

(3) an organic carrier:

a binder: ethyl cellulose (Dow Chemical Co., Ltd., STD4); a solvent: terpineol (Nippon Terpine Co., Ltd.); and a thixotropic agent: DISPARLON 6500 (Kusumoto Chemicals, Ltd.).

1 wt % of ethyl cellulose and 0.6 wt % of a thixotropic agent were fully dissolved in 6 wt % of terpineol at 50° C.; and 90 wt % of Ag powder and 2.4 wt % of GOC were added into the obtained solution and mixed uniformly, and the obtained mixture was then mixed and dispersed by using a three-roll mixer to obtain metallized silver paste P0-1, and P1-P4.

Under the premise of keeping the other components unchanged, only the GOC content was increased to 2.5 wt %, uniform mixing was carried out, and the obtained mixture was then mixed and dispersed by using the three-roll mixer to obtain metallized silver paste P0-2, and P5-P8.

Under the premise of keeping the other components unchanged, only the GOC content was increased to 2.6 wt %, uniform mixing was carried out, and the obtained mixture was then mixed and dispersed by using the three-roll mixer to obtain metallized silver paste P0-3, and P9-P12.

Under the premise of keeping the other components unchanged, only the GOC content was increased to 3 wt %, uniform mixing was carried out, and the obtained mixture was then mixed and dispersed by using the three-roll mixer to obtain metallized silver paste P0-4, and P13-P16.

Under the premise of keeping the other components unchanged, only the GOC content was increased to 4.2 wt %, uniform mixing was carried out, and the obtained mixture was then mixed and dispersed by using the three-roll mixer to obtain metallized silver paste P0-5, and P17-P20.

80 mg of each type of metallized silver paste and 600 mg of aluminum paste were printed on the front and back sides of silicon wafers with different passivation layer thicknesses in predetermined patterns by means of silk-screen printing, and dried in an infrared drying oven. The silicon wafers were rapidly sintered in a rapid sintering furnace at 900° C. for 30 minutes and cooled to room temperature, thereby preparing a solar cell.

The structure of the obtained solar cell is shown in the Drawing. The metallized silver paste was sintered to form a front electrode, and the aluminum paste was sintered to form a back partial contact. The structure of a pure silicon wafer includes: front $SiN_x$-silicon wafer-$Al_2O_3$-back $SiN_x$.

The performance of the solar cell was tested and characterized by using EL images through an EL tester. The foggy black (foggy blackening with light darkness) of the cell was expressed as: serious which referred to that a foggy black area was greater than 20% of a total area of cells; general which referred to that 10% of the total area of the cells was less than or equal to the foggy black area, and the foggy black area was less than or equal to 20% of the total area of the cells; acceptable which referred to slight foggy black, where the foggy black area was less than 10% of the total area of the cells; and excellent which referred to no foggy black. The results are shown in Tables 2-6.

TABLE 2

Conductive paste formula and EL test results of cells when a passivation layer thickness is 52 nm

|  | P0-1 | P1 | P2 | P3 | P4 |
|---|---|---|---|---|---|
| Mix1 (wt %) | 2.4 | / | / | / | / |
| A-GOC1 (wt %) | / | 0.23 | 0.48 | 0.80 | 1.00 |
| L-GOC1 (wt %) | / | 0.34 | 0.34 | 0.39 | 0.39 |
| T-GOC1 (wt %) | / | 1.69 | 1.51 | 1.20 | 1.00 |
| D-GOC1 (wt %) | / | 0.14 | 0.07 | 0.01 | 0.01 |

TABLE 2-continued

Conductive paste formula and EL test results of cells when a passivation layer thickness is 52 nm

|    | P0-1    | P1      | P2                           | P3             | P4                           |
|----|---------|---------|------------------------------|----------------|------------------------------|
| EL | General | General | Slight foggy black-acceptable | No foggy black | Slight foggy black-acceptable |

TABLE 3

Conductive paste formula and EL test results of cells when a passivation layer thickness is 60 nm

|              | P0-2    | P5      | P6                           | P7             | P8                           |
|--------------|---------|---------|------------------------------|----------------|------------------------------|
| Mix1 (wt %)  | 2.5     | /       | /                            | /              | /                            |
| A-GOC1 (wt %)| /       | 0.24    | 0.5                          | 0.83           | 1.04                         |
| L-GOC1 (wt %)| /       | 0.36    | 0.35                         | 0.4            | 0.4                          |
| T-GOC1 (wt %)| /       | 1.76    | 1.58                         | 1.25           | 1.04                         |
| D-GOC1 (wt %)| /       | 0.14    | 0.07                         | 0.02           | 0.02                         |
| EL           | General | General | Slight foggy black-acceptable | No foggy black | Slight foggy black-acceptable |

TABLE 4

Conductive paste formula and EL test results of cells when a passivation layer thickness is 68 nm

|              | P0-3    | P9                           | P10                          | P11            | P12                          |
|--------------|---------|------------------------------|------------------------------|----------------|------------------------------|
| Mix1 (wt %)  | 2.6     | /                            | /                            | /              | /                            |
| A-GOC1 (wt %)| /       | 0.25                         | 0.52                         | 0.86           | 1.08                         |
| L-GOC1 (wt %)| /       | 0.37                         | 0.37                         | 0.41           | 0.41                         |
| T-GOC1 (wt %)| /       | 1.83                         | 1.64                         | 1.30           | 1.08                         |
| D-GOC1 (wt %)| /       | 0.15                         | 0.07                         | 0.03           | 0.03                         |
| EL           | General | Slight foggy black-acceptable | Slight foggy black-acceptable | No foggy black | Slight foggy black-acceptable |

TABLE 5

Conductive paste formula and EL test results of cells when a passivation layer thickness is 72 nm

|              | P0-4    | P13     | P14                          | P15            | P16                          |
|--------------|---------|---------|------------------------------|----------------|------------------------------|
| Mix1 (wt %)  | 3       | /       | /                            | /              | /                            |
| A-GOC1 (wt %)| /       | 0.29    | 0.60                         | 1.00           | 1.25                         |
| L-GOC1 (wt %)| /       | 0.43    | 0.42                         | 0.45           | 0.45                         |
| T-GOC1 (wt %)| /       | 2.11    | 1.90                         | 1.50           | 1.25                         |
| D-GOC1 (wt %)| /       | 0.17    | 0.08                         | 0.05           | 0.05                         |
| EL           | General | General | Slight foggy black-acceptable | No foggy black | Slight foggy black-acceptable |

TABLE 6

Conductive paste formula and EL test results of cells when a passivation layer thickness is 80 nm

|              | P0-5    | P17     | P18                          | P19            | P20                          |
|--------------|---------|---------|------------------------------|----------------|------------------------------|
| Mix1 (wt %)  | 4.2     | /       | /                            | /              | /                            |
| A-GOC1 (wt %)| /       | 0.40    | 0.84                         | 1.39           | 1.75                         |
| L-GOC1 (wt %)| /       | 0.60    | 0.59                         | 0.63           | 0.63                         |
| T-GOC1 (wt %)| /       | 2.96    | 2.65                         | 2.10           | 1.74                         |
| D-GOC1 (wt %)| /       | 0.24    | 0.12                         | 0.08           | 0.08                         |
| EL           | General | General | Slight foggy black-acceptable | No foggy black | Slight foggy black-acceptable |

In the testing process of the solar cell, the present disclosure conducted statistical confidence analysis (p value analysis) on electrical performance testing, and the obtained test samples and reference samples were significantly different ($p<0.05$), thus excluding the difference caused by test errors.

Example 2

Preparation of a Glass-Oxide-Complex (GOC) System:
Different A-GOC2, L-GOC2, T-GOC2, and D-GOC2 were prepared from the components described in Table 7 below, and a single component Mix2 without separation was also prepared as a control. Samples were prepared in batches of 200 g by mixing the individual oxide components in the amounts specified in Table 1. The oxide mixture was put into a 0.5 L platinum crucible, and then the crucible was put into a glass melting furnace at 1,300° C. for 30 minutes to obtain a glass and oxide frit. The frit was taken out and poured into a twin-roll cooler for quenching to obtain glass slag. After being ground in a 1 L planetary ball mill, the glass slag was sieved with a 325-mesh sieve to obtain A-GOC2 powder, L-GOC2 powder, T-GOC2 powder, D-GOC2 powder, and Mix2 powder, respectively.

TABLE 7

Formulas of A-GOC2, L-GOC2, T-GOC2, D-GOC2 and Mix2

|  |  | Mix2 | A-GOC2 | L-GOC2 | T-GOC2 | D-GOC2 |
|---|---|---|---|---|---|---|
| A-GOC | $Li_2O$ | 5.73% | 20.47% | / | / | / |
|  | PbO | 17.93% | 64.06% | / | / | / |
|  | $B_2O_3$ | 3.60% | 12.86% | / | / | / |
|  | ZnO | / | 0.00% | / | / | / |
|  | $B_2O_3$ | 0.73% | 2.61% | / | / | / |
| L-GOC | PbO | 1.15% | / | 3.73% | / | / |
|  | $Bi_2O_3$ | 18.76% | / | 60.83% | / | / |
|  | $Al_2O_3$ | 3.55% | / | 11.51% | / | / |
|  | $SiO_2$ | 0.64% | / | 2.08% | / | / |
|  | $B_2O_3$ | 6.74% | / | 21.85% | / | / |
| T-GOC | $SiO_2$ | 5.73% | / | / | 14.82% | / |
|  | $TeO_2$ | 28.67% | / | / | 74.16% | / |
|  | $Bi_2O_3$ | 3.60% | / | / | 9.32% | / |
|  | $B_2O_3$ | 0.33% | / | / | 0.85% | / |
|  | $Na_2O$ | 0.33% | / | / | 0.85% | / |
| D-GOC | $SiO_2$ | 0.93% | / | / | / | 37.05% |
|  | PbO | 0.56% | / | / | / | 22.31% |
|  | MgO | 0.07% | / | / | / | 2.79% |
|  | $TiO_2$ | 0.04% | / | / | / | 1.59% |
|  | $Bi_2O_3$ | 0.91% | / | / | / | 36.26% |

Preparation of Conductive Paste:

A list of components used in the following examples and control examples is as follows:

(1) conductive powder: spherical silver powder (AG-4-8, Dowa HighTech Co., Ltd.) with an average particle size (D50) of 2 μm;

(2) a glass and oxide complex GOC: Mix2, or a multi-component mixture of A-GOC2, L-GOC2, T-GOC2, and D-GOC2;

(3) an organic carrier:

a binder: ethyl cellulose (Dow Chemical Co., Ltd., STD4); a solvent: terpineol (Nippon Terpine Co., Ltd.); and a thixotropic agent: DISPARLON 6500 (Kusumoto Chemicals, Ltd.).

1 wt % of ethyl cellulose and 0.6 wt % of a thixotropic agent were fully dissolved in 6 wt % of terpineol at 50° C.; and 90 wt % of Ag powder and 2.4 wt % of GOC were added into the obtained solution and mixed uniformly, and the obtained mixture was then mixed and dispersed by using a three-roll mixer to obtain metallized silver paste P0-6, and P21-P24.

Under the premise of keeping the other components unchanged, only the GOC content was increased to 2.5 wt %, uniform mixing was carried out, and the obtained mixture was then mixed and dispersed by using the three-roll mixer to obtain metallized silver paste P0-7, and P25-P28.

Under the premise of keeping the other components unchanged, only the GOC content was increased to 2.6 wt %, uniform mixing was carried out, and the obtained mixture was then mixed and dispersed by using the three-roll mixer to obtain metallized silver paste P0-8, and P29-P32.

Under the premise of keeping the other components unchanged, only the GOC content was increased to 3 wt %, uniform mixing was carried out, and the obtained mixture was then mixed and dispersed by using the three-roll mixer to obtain metallized silver paste P0-9, and P33-P36.

Under the premise of keeping the other components unchanged, only the GOC content was increased to 4.2 wt %, uniform mixing was carried out, and the obtained mixture was then mixed and dispersed by using the three-roll mixer to obtain metallized silver paste P0-10, and P37-P40.

80 mg of each type of metallized silver paste and 600 mg of aluminum paste were printed on the front and back sides of silicon wafers with different passivation layer thicknesses in predetermined patterns by means of silk-screen printing, and dried in an infrared drying oven. The silicon wafers were rapidly sintered in a rapid sintering furnace at 900° C. for 30 minutes and cooled to room temperature, thereby preparing a solar cell.

The structure of the obtained solar cell is shown in the Drawing. The metallized silver paste was sintered to form a front electrode, and the aluminum paste was sintered to form a back partial contact. The structure of a pure silicon wafer includes: front $SiN_x$-silicon wafer-$Al_2O_3$-back $SiN_x$.

The performance of the solar cell was tested and characterized by using EL images through an EL tester. The foggy black of the cell was expressed as: serious which referred to that a foggy black area was greater than 20% of a total area of cells; general which referred to that 10% of the total area of the cells was less than or equal to the foggy black area, and the foggy black area was less than or equal to 20% of the total area of the cells; acceptable which referred to slight foggy black, where the foggy black area was less than 10% of the total area of the cells; and excellent which referred to no foggy black. The results are shown in Tables 8-12.

TABLE 8

Conductive paste formula and EL test results of cells when a passivation layer thickness is 44 nm

|  | P0-6 | P21 | P22 | P23 | P24 |
|---|---|---|---|---|---|
| Mix2 (wt %) | 2.04 | / | / | / | / |
| A-GOC1 (wt %) | / | 0.20 | 0.40 | 0.67 | 0.85 |
| L-GOC1 (wt %) | / | 0.29 | 0.29 | 0.31 | 0.31 |
| T-GOC1 (wt %) | / | 1.43 | 1.29 | 1.05 | 0.87 |
| D-GOC1 (wt %) | / | 0.12 | 0.06 | 0.01 | 0.01 |
| EL | General | General | Slight foggy black-acceptable | No foggy black | Slight foggy black-acceptable |

TABLE 9

Conductive paste formula and EL test results of cells when a passivation layer thickness is 48 nm

|  | P0-7 | P25 | P26 | P27 | P28 |
|---|---|---|---|---|---|
| Mix2 (wt %) | 2.37 | / | / | / | / |
| A-GOC1 (wt %) | / | 0.23 | 0.47 | 0.78 | 0.99 |
| L-GOC1 (wt %) | / | 0.33 | 0.33 | 0.37 | 0.37 |
| T-GOC1 (wt %) | / | 1.67 | 1.50 | 1.21 | 0.99 |
| D-GOC1 (wt %) | / | 0.14 | 0.07 | 0.01 | 0.02 |
| EL | General | General | Slight foggy black-acceptable | No foggy black | Slight foggy black-acceptable |

TABLE 10

Conductive paste formula and EL test results of cells when a passivation layer thickness is 56 nm

|  | P0-8 | P29 | P30 | P31 | P32 |
|---|---|---|---|---|---|
| Mix2 (wt %) | 2.63 | / | / | / | / |
| A-GOC1 (wt %) | / | 0.25 | 0.53 | 0.85 | 1.07 |
| L-GOC1 (wt %) | / | 0.38 | 0.37 | 0.42 | 0.43 |
| T-GOC1 (wt %) | / | 1.85 | 1.66 | 1.35 | 1.10 |
| D-GOC1 (wt %) | / | 0.15 | 0.07 | 0.01 | 0.03 |
| EL | General | Slight foggy black-acceptable | Slight foggy black-acceptable | No foggy black | Slight foggy black-acceptable |

TABLE 11

Conductive paste formula and EL test results of cells when a passivation layer thickness is 64 nm

|  | P0-9 | P33 | P34 | P35 | P36 |
|---|---|---|---|---|---|
| Mix2 (wt %) | 2.78 | / | / | / | / |
| A-GOC1 (wt %) | / | 0.27 | 0.55 | 0.89 | 1.15 |
| L-GOC1 (wt %) | / | 0.40 | 0.39 | 0.43 | 0.42 |
| T-GOC1 (wt %) | / | 1.95 | 1.76 | 1.44 | 1.16 |
| D-GOC1 (wt %) | / | 0.16 | 0.08 | 0.02 | 0.05 |
| EL | General | General | Slight foggy black-acceptable | No foggy black | Slight foggy black-acceptable |

TABLE 12

Conductive paste formula and EL test results of cells when a passivation layer thickness is 76 nm

|  | P0-10 | P37 | P38 | P39 | P40 |
|---|---|---|---|---|---|
| Mix2 (wt %) | 3.86 | / | / | / | / |
| A-GOC1 (wt %) | / | 0.37 | 0.77 | 1.23 | 1.61 |
| L-GOC1 (wt %) | / | 0.55 | 0.54 | 0.56 | 0.58 |
| T-GOC1 (wt %) | / | 2.72 | 2.44 | 2.02 | 1.61 |
| D-GOC1 (wt %) | / | 0.22 | 0.11 | 0.06 | 0.07 |
| EL | General | General | Slight foggy black-acceptable | No foggy black | Slight foggy black-acceptable |

From the view of the results of printing and performance testing of silicon wafers with different passivation layer thicknesses, with the increase of the passivation layer thickness, the percentage of glass powder in a formula system gradually increases. Compared with MIX1 and MIX2, the separated A-GOC, L-GOC, T-GOC and D-GOC can achieve obviously superior results by continuously adjusting the proportion of all the components. According to the effects of the A-GOC1, the L-GOC1, the T-GOC1 and the D-GOC1 on different passivation layers in different proportions, P3, P7, P11, P15 and P19 show the best effect. According to the effects of the A-GOC2, the L-GOC2, the T-GOC2 and the D-GOC2 on different passivation layers in different proportions, P23, P27, P31, P35 and P39 show the best effect.

Comparative Example 1

Different Na-GOC, Pb-GOC, Si—Te-GOC, and Si-GOC were prepared from the components described in Table 13 below, and a single component Mix3 without separation was also prepared as a control. Samples were prepared in batches of 200 g by mixing the individual oxide components in the amounts specified in Table 13. The oxide mixture was put into a 0.5 L platinum crucible, and then the crucible was put into a glass melting furnace at 1,300° C. for 30 minutes to obtain a glass and oxide frit. The frit was taken out and poured into a twin-roll cooler for quenching to obtain glass slag. After being ground in a 1 L planetary ball mill, the glass slag was sieved with a 325-mesh sieve to obtain GOC powder and Mix3 powder.

Preparation of conductive paste and cells: formulas and production of paste P0-11 to P0-15 and P41-P60 were implemented according to the process in Example 1. Corresponding performance test results are shown in Tables 14-15.

TABLE 13

Formulas of Na-GOC, Pb-GOC, Si-Te-GOC, Si-GOC and Mix3

|   |   | Mix3 | Na-GOC | Pb-GOC | Si-Te-GOC | Si-GOC |
|---|---|---|---|---|---|---|
| Na-GOC | $Na_2O$ | 6.04% | 19.36% | / | / | / |
|  | PbO | 18.20% | 58.31% | / | / | / |
|  | $Bi_2O_3$ | 4.87% | 15.60% | / | / | / |
|  | ZnO | 1.80% | 5.77% | / | / | / |
|  | $B_2O_2$ | 0.30% | 0.96% | / | / | / |
| Pb-GOC | PbO | 0.57% | / | 2.19% | / | / |
|  | $Bi_2O_3$ | 16.39% | / | 63.02% | / | / |
|  | $Al_2O_3$ | 2.83% | / | 10.88% | / | / |
|  | $SiO_2$ | 0.57% | / | 2.19% | / | / |
|  | $B_2O_3$ | 5.65% | / | 21.72% | / | / |
| Si-Te-GOC | $SiO_2$ | 6.07% | / | / | 14.95% | / |
|  | $TeO_2$ | 27.27% | / | / | 67.14% | / |
|  | $Bi_2O_3$ | 6.07% | / | / | 14.95% | / |
|  | $B_2O_2$ | 0.60% | / | / | 1.48% | / |
|  | $Na_2O$ | 0.60% | / | / | 1.48% | / |
| Si-GOC | $SiO_2$ | 1.00% | / | / | / | 46.08% |
|  | PbO | 0.50% | / | / | / | 23.04% |
|  | MgO | 0.05% | / | / | / | 2.30% |
|  | $TiO_2$ | 0.02% | / | / | / | 0.92% |
|  | $Bi_2O_3$ | 0.60% | / | / | / | 27.65% |

TABLE 14

Conductive paste formula and EL test results of cells when a passivation layer thickness is 60 nm

|  | P0-12 | P45 | P46 | P47 | P48 |
|---|---|---|---|---|---|
| Mix3 (wt %) | 2.5 | / | / | / | / |
| Na-GOC (wt %) | / | 0.24 | 0.5 | 0.83 | 1.04 |
| Pb-GOC (wt %) | / | 0.36 | 0.35 | 0.4 | 0.4 |
| Si-Te-GOC (wt %) | / | 1.76 | 1.58 | 1.25 | 1.04 |
| Si-GOC (wt %) | / | 0.14 | 0.07 | 0.02 | 0.02 |
| EL | General | General | Slight foggy black-acceptable | serious | Slight foggy black-acceptable |

TABLE 15

Conductive paste formula and EL test results of cells when a passivation layer thickness is 80 nm

|  | P0-15 | P57 | P58 | P59 | P60 |
|---|---|---|---|---|---|
| Mix3 (wt %) | 4.2 | / | / | / | / |
| Na-GOC (wt %) | / | 0.40 | 0.84 | 1.39 | 1.75 |
| Pb-GOC (wt %) | / | 0.60 | 0.59 | 0.63 | 0.63 |

TABLE 15-continued

Conductive paste formula and EL test results of cells when a passivation layer thickness is 80 nm

|  | P0-15 | P57 | P58 | P59 | P60 |
|---|---|---|---|---|---|
| Si-Te-GOC (wt %) | / | 2.96 | 2.65 | 2.10 | 1.75 |
| Si-GOC (wt %) | / | 0.24 | 0.12 | 0.08 | 0.08 |
| EL | General | General | General | serious | Slight foggy black-acceptable |

It can be seen from the results of Comparative Example 1 that the paste prepared by using the separated Na-GOC, Pb-GOC, Si—Te-GOC and Si-GOC is not very ideal in EL test results, and more in foggy black phenomena.

Comparative Example 2

Different Li-GOC, Pb-GOC, Bi—Te-GOC, and Si-GOC were prepared from the components described in Table 16 below, and a single component Mix4 without separation was also prepared as a control. Samples were prepared in batches of 200 g by mixing the individual oxide components in the amounts specified in Table 19. The oxide mixture was put into a 0.5 L platinum crucible, and then the crucible was put into a glass melting furnace at 1300° C. for 30 minutes to obtain a glass and oxide frit. The frit was taken out and poured into a twin-roll cooler for quenching to obtain glass slag. After being ground in a 1 L planetary ball mill, the glass slag was sieved with a 325-mesh sieve to obtain GOC powder and Mix4 powder.

Preparation of conductive paste and cells: formulas and production of paste P0-16 to P0-P20 and P61-P80 were implemented according to the process in Example 2. Corresponding performance test results are shown in Tables 17-21.

TABLE 16

Formulas of Li-GOC, Pb-GOC, Bi-Te-GOC, Si-GOC and Mix4

|  |  | Mix4 | Li-GOC | Pb-GOC | Bi-Te-GOC | Si-GOC |
|---|---|---|---|---|---|---|
| Li-GOC | $Li_2O$ | 5.73% | 20.47% | / | / | / |
|  | PbO | 17.93% | 64.06% | / | / | / |
|  | $Bi_2O_3$ | 3.60% | 12.86% | / | / | / |
|  | ZnO | / | 0.00% | / | / | / |
|  | $B_2O_3$ | 0.73% | 2.61% | / | / | / |
| Pb-GOC | PbO | 1.15% | / | 3.73% | / | / |
|  | $Bi_2O_3$ | 18.76% | / | 60.83% | / | / |
|  | $Al_2O_3$ | 3.55% | / | 11.51% | / | / |
|  | $SiO_2$ | 0.64% | / | 2.08% | / | / |
|  | $B_2O_3$ | 6.74% | / | 21.85% | / | / |
| Bi-Te-GOC | $SiO_2$ | 5.73% | / | / | 14.82% | / |
|  | $TeO_2$ | 28.67% | / | / | 74.16% | / |
|  | $Bi_2O_3$ | 3.60% | / | / | 9.32% | / |
|  | $B_2O_3$ | 0.33% | / | / | 0.85% | / |
|  | MgO | 0.33% | / | / | 0.85% | / |
| Si-GOC | $SiO_2$ | 0.93% | / | / | / | 37.05% |
|  | PbO | 0.56% | / | / | / | 22.31% |
|  | MgO | 0.07% | / | / | / | 2.79% |
|  | $TiO_2$ | 0.04% | / | / | / | 1.59% |
|  | $Bi_2O_3$ | 0.91% | / | / | / | 36.26% |

TABLE 17

Conductive paste formula and EL test results of cells when a passivation layer thickness is 44 nm

|  | P0-16 | P61 | P62 | P63 | P64 |
|---|---|---|---|---|---|
| Mix4 (wt %) | 2.04 | / | / | / | / |
| Li-GOC (wt %) | / | 0.19 | 0.41 | 0.67 | 0.85 |
| Pb-GOC (wt %) | / | 0.29 | 0.29 | 0.31 | 0.31 |
| Bi-Te-GOC (wt %) | / | 1.43 | 1.29 | 1.05 | 0.87 |
| Si-GOC (wt %) | / | 0.12 | 0.06 | 0.01 | 0.01 |
| EL | General | General | Serious | Slight foggy black-acceptable | General |

TABLE 18

Conductive paste formula and EL test results of cells when a passivation layer thickness is 48 nm

|  | P0-17 | P65 | P66 | P67 | P68 |
|---|---|---|---|---|---|
| Mix4 (wt %) | 2.37 | / | / | / | / |
| Li-GOC (wt %) | / | 0.23 | 0.47 | 0.78 | 0.99 |
| Pb-GOC (wt %) | / | 0.34 | 0.33 | 0.37 | 0.37 |
| Bi-Te-GOC (wt %) | / | 1.66 | 1.50 | 1.21 | 0.99 |
| Si-GOC (wt %) | / | 0.14 | 0.07 | 0.01 | 0.02 |
| EL | Slight foggy black-acceptable | Serious | General | General | Slight foggy black-acceptable |

TABLE 19

Conductive paste formula and EL test results of cells when a passivation layer thickness is 56 nm

|  | P0-18 | P69 | P70 | P71 | P72 |
|---|---|---|---|---|---|
| Mix4 (wt %) | 2.63 | / | / | / | / |
| Li-GOC (wt %) | / | 0.25 | 0.53 | 0.85 | 1.08 |
| Pb-GOC (wt %) | / | 0.38 | 0.37 | 0.42 | 0.43 |
| Bi-Te-GOC (wt %) | / | 1.85 | 1.66 | 1.35 | 1.09 |
| Si-GOC (wt %) | / | 0.15 | 0.07 | 0.01 | 0.03 |
| EL | General | General | Slight foggy black-acceptable | Serious | Slight foggy black-acceptable |

TABLE 20

Conductive paste formula and EL test results of cells when a passivation layer thickness is 64 nm

|  | P0-19 | P73 | P74 | P75 | P76 |
|---|---|---|---|---|---|
| Mix4 (wt %) | 2.78 | / | / | / | / |
| Li-GOC (wt %) | / | 0.27 | 0.56 | 0.89 | 1.16 |
| Pb-GOC (wt %) | / | 0.40 | 0.39 | 0.43 | 0.42 |
| Bi-Te-GOC (wt %) | / | 1.95 | 1.76 | 1.44 | 1.16 |
| Si-GOC (wt %) | / | 0.16 | 0.08 | 0.02 | 0.05 |
| EL | Slight foggy black-acceptable | General | Serious | General | Slight foggy black-acceptable |

TABLE 21

Conductive paste formula and EL test results of cells when a passivation layer thickness is 76 nm

|  | P0-20 | P77 | P78 | P79 | P80 |
|---|---|---|---|---|---|
| Mix4 (wt %) | 3.86 | / | / | / | / |
| Li-GOC (wt %) | / | 0.37 | 0.77 | 1.23 | 1.61 |
| Pb-GOC (wt %) | / | 0.55 | 0.54 | 0.56 | 0.58 |
| Bi-Te-GOC (wt %) | / | 2.72 | 2.44 | 2.02 | 1.61 |
| Si-GOC (wt %) | / | 0.22 | 0.11 | 0.06 | 0.07 |
| EL | General | Serious | General | Slight foggy black-acceptable | General |

It can be seen from the results of Comparative Example 2 that the paste prepared by using the separated Bi—Te-GOC, Li-GOC, Pb-GOC and Si-GOC is not very ideal in EL test results, and more in foggy black phenomena, thus having a failure in achieving the purpose of improving battery performance.

Although the present disclosure has been disclosed as above with exemplary embodiments, it is not intended to limit the present disclosure. Those skilled in the art can make various changes and modifications without departing from the spirit and scope of the present disclosure. Therefore, the protection scope of the present disclosure shall be defined in the claims.

What is claimed is:

1. A lithium-tellurium silicon-lead bismuth multi-component glass-oxide-complex system for solar cell conductive paste, wherein the system is prepared by mixing a lithium-containing glass-oxide-complex (A-GOC), a tellurium silicon-containing glass-oxide-complex (T-GOC), a lead bismuth-containing glass-oxide-complex (L-GOC), and a balanced phase glass-oxide-complex (D-GOC), wherein
the lithium-containing glass-oxide-complex (A-GOC) is obtained by mixing and melting $Li_2O$, $Bi_2O_3$, PbO, ZnO, and $B_2O_3$ to form a glass-oxide frit, then quenching, and grinding; and based on the total mass of A-GOC, the formula of the A-GOC comprises: 15-25% by mass of $Li_2O$, 50-70% by mass of PbO, 10-20% by mass of $Bi_2O_3$, 0-6% by mass of ZnO, and 0.5-3% by mass of $B_2O_3$;
the lead bismuth-containing glass-oxide-complex (L-GOC) is obtained by mixing and melting PbO, $Bi_2O_3$, $SiO_2$, $Al_2O_3$, ZnO and $B_2O_3$ to form a glass-oxide frit, then quenching, and grinding; and based on the total mass of the L-GOC, a formula of the L-GOC comprises: 2-50% by mass of PbO, 5-85% by mass of $Bi_2O_3$, 2-10% by mass of $SiO_2$, 0.5-15% by mass of $Al_2O_3$, 0-6% by mass of ZnO, and 0.5-25% by mass of $B_2O_3$;

the tellurium silicon-containing glass-oxide-complex (T-GOC) is obtained by mixing and melting $SiO_2$, $TeO_2$—, $Bi_2O_3$, $O_2O_3$, and $Na_2O$ to form a glass-oxide frit, then quenching, and grinding; and based on the total mass of the T-GOC, the formula of the T-GOC comprises: 10-20% by mass of $SiO_2$, 60-80% by mass of $TeO_2$, 2-20% by mass of $Bi_2O_3$, 0.5-2% by mass of $B_2O_3$, and 0.5-2% by mass of $Na_2O$;

the balanced phase glass-oxide-complex (D-GOC) is obtained by mixing and melting one or more metal oxides used in the A-GOC, the L-GOC and the T-GOC to form a glass-oxide frit, then quenching, and grinding; and based on the total mass of the D-GOC, a formula of the D-GOC comprises: 35-50% by mass of $SiO_2$, 20-30% by mass of PbO, 2-10% by mass of MgO, 0.5-2% by mass of $TiO_2$, and 25-40% by mass of $Bi_2O_3$.

2. Conductive paste containing the lithium-tellurium silicon-lead bismuth multi-component glass-oxide-complex system according to claim 1.

* * * * *